ANTENNA BOOM AND FEED LINE STRUCTURE

Filed May 6, 1968 6 Sheets-Sheet 1

INVENTORS
NORMAND BARBANO
HOWARD HOCHMAN
BY John F. Lawler
ATTORNEY

ANTENNA BOOM AND FEED LINE STRUCTURE

INVENTORS
NORMAND BARBANO
HOWARD HOCHMAN
BY John F. Lawler
ATTORNEY

Dec. 22, 1970 N. BARBANO ET AL 3,550,144

ANTENNA BOOM AND FEED LINE STRUCTURE

Filed May 6, 1968 6 Sheets-Sheet 3

INVENTORS
NORMAND BARBANO
HOWARD HOCHMAN

BY John F. Lawler

ATTORNEY

ANTENNA BOOM AND FEED LINE STRUCTURE

INVENTORS
NORMAND BARBANO
HOWARD HOCHMAN

BY John F. Lawler
ATTORNEY

ANTENNA BOOM AND FEED LINE STRUCTURE

Filed May 6, 1968 6 Sheets-Sheet 5

INVENTORS
NORMAND BARBANO
HOWARD HOCHMAN
BY [signature]
ATTORNEY

INVENTORS
NORMAND BARBANO
HOWARD HOCHMAN
BY [signature]
ATTORNEY

United States Patent Office 3,550,144

Patented Dec. 22, 1970

3,550,144

ANTENNA BOOM AND FEED LINE STRUCTURE

Normand Barbano, Sunnyvale, and Howard Hochman, Santa Clara, Calif., assignors to Sylvania Electric Products Inc., a corporation of Delaware Filed May 6, 1968, Ser. No. 726,670
Int. Cl. H01q *11/10, 1/22*
U.S. Cl. 343—792.5 7 Claims

ABSTRACT OF THE DISCLOSURE

This television antenna comprises three log periodic arrays mounted on one boom in end-to-end relation for receiving television and FM broadcast frequencies in three separate bands. All of the elements in the three arrays lie in the plane of the boom. Each of the two higher frequency arrays comprises a series of log periodic Yagi-Uda cells with each parasitic element functioning as a director for one cell and a reflector for the adjacent cell. The axial locations of the parasitic elements are adjusted to match the impedance of dipoles to the feed line and are independent of the log periodic dimensions and spacings of the dipoles. Double parasitic elements are located adjacent to the driven elements in the high VHF band to provide a smooth transition in frequency response between adjacent driven elements and insure substantially uniform antenna patterns over the band.

The single boom or longitudinal support for the active and parasitic elements is a hollow split tube, preferably rectangular in cross section, comprised of juxtaposed electrically conductive substantially identical channel members mechanically secured to each other in relation by insulators. These members also constitute balanced feed lines for the antenna elements, being electrically connected at one end to the inner and outer conductors, respectively, of a coaxial insulated cable which extends within the members from the opposite end.

BACKGROUND OF THE INVENTION

This invention relates to antennas, and in particular to an extremely high performance antenna for domestic reception of television and FM signals.

One of the difficult problems in the design of domestic television antennas is the relatively large span of frequencies they must receive. Presently the range extends from 54 mHz. (channel 2) to 890 mHz. (channel 80). Since performance characteristics including gain and front to back ratio are strictly related to the electrical length of the antenna, attempts to limit the overall physical length to a practicable dimension, such as the customary 15½ to 16 feet, have resulted in compromises which degrade efficient reception of signals.

A typical compromise adopted by many manufacturers of commercial television antennas is to superimpose elements in one frequency band on elements of another by stacking, telescoping or interspersing the respective elements. For example, the UHF elements may be mounted between VHF elements on the same length of the boom. Not only have such antennas had limited success in achieving electrical efficiency required for high quality reception of signals but they have also necessitated mechanically complex feeding and supporting structures which increase the fabrication cost and complicate installation procedures.

In addition to electrical performance, domestic television antennas should be sufficiently simple in design to permit installation by the do-it-yourself home owner as well as to facilitate handling and shipping. The structure should be lightweight and capable of being readily assembled by the amateur and professional installer alike. Moreover, the position of prominence that a television antenna occupies on the home or other dwelling dictates an aesthetic standard which frequently is not met by antenna structures with superimposed elements or stacked arrays.

SUMMARY OF THE INVENTION

An exceptionally high performance television antenna is provided by constructing the high VHF and UHF sections as a plurality of Yagi-Uda cells in longitudinal series having log periodically related driven elements and interspersed parasitic elements. The parasitic elements are non-linearly or non-logarithmically spaced from the active elements and each parasitic functions as a director and as a reflector for adjacent cells. This arrangement of elements permits reduction of the physical length of these antenna sections without corresponding reduction of the electrical length while maintaining an optimum impedance match between the driven elements and the feed line. Accordingly the antenna gain and front to back ratio, which are directly related to electrical length of the antenna, are relatively high while VSWR is minimum and reception patterns substantially uniform over all bands.

The hollow boom which supports the antenna elements is also a two-conductor transmission line having a characteristic impedance when loaded that is substantially the same as the characteristic impedance of the coaxial line which feeds it. Symmetrical spacing of the twin boom members improves impedance matching of the line to antenna elements.

A general object is the provision of a high performance television antenna having a mechanically simple lightweight structure that is economical to produce and convenient to ship and assemble.

A further object is the provision of a broadband log periodic array with parasitic elements interspersed between driven elements in a manner to improve the match of impedance of all dipoles to the feed line.

Another object is the provision of such an array with an improved arrangement of parasitic elements for insuring a uniform antenna response pattern over the VHF band.

A further object is the provision of a television antenna with a combination boom and feed line assembly for supporting and feeding all receiving elements in the VHF-UHF-FM bands in the plane of the boom.

DESCRIPTION OF PREFERRED EMBODIMENTS

Figure 1:
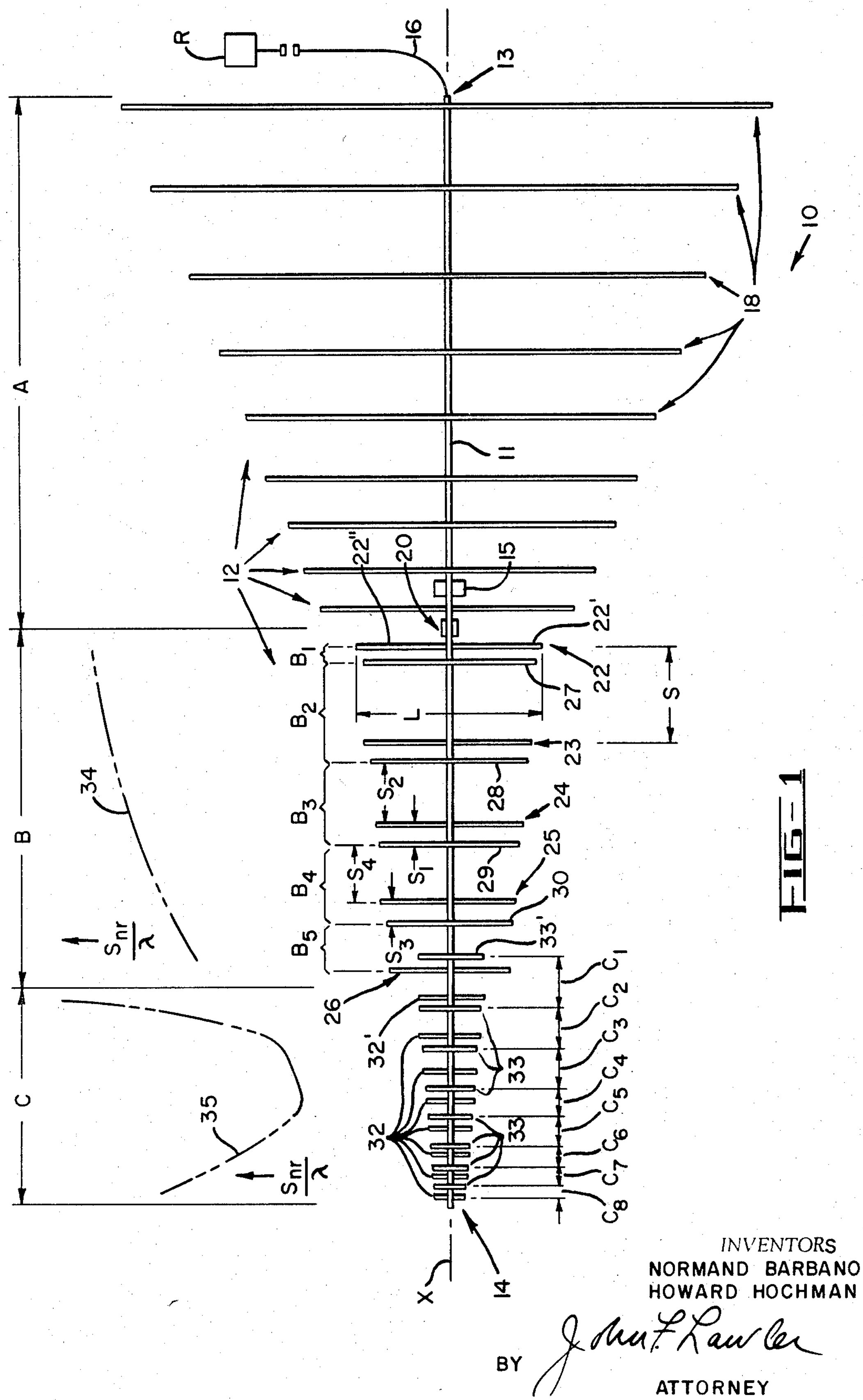
FIG. 1 is a plan view of the complete television antenna embodying this invention.

An embodiment of the invention is shown in FIG. 1 as an antenna 10 having a boom 11 extending along the axis of the antenna and supporting a plurality of axially spaced transversely extending parallel elements 12 from the low frequency end 13 to the high frequency end 14 of the antenna. A bracket 15 mounted on the central part of boom 11 provides a mechanical connection to the mast, not shown. A coaxial cable 16 extends from the low frequency end of boom 11 for connection to external circuits such as a television receiver R. The antenna preferably is constructed to receive signals in the broadcast television and frequency modulation (FM) bands which are divided into three groups:

Group A: low VHF and FM—54 to 108 mHz.
Group B: high VHF—174 to 216 mHz.
Group C: UHF—470 to 890 mHz.

The antenna 10, for purposes of this description, is divided into sections A, B and C as shown to indicate the frequency separated portions of the antenna which receive signals in the above identified frequency groups A, B and C, respectively. The lengths and spacings of the elements in antenna section A vary in accordance with a logarithmically periodic constant $\tau$ in a manner well known in the art and therefore this aspect of the design of section A does not constitute part of this invention. Elements 12 in sections B and C, however, comprise a succession or series of cells of a Yagi-Uda array, each complete cell including a driven element, a reflector and a director. The size and spacings of the elements of the cells are related to each other in a manner described below to achieve the required electrical length for maximum gain, front to back ratio and pattern uniformity without superposition of these cells and within the size limitations established by custom and installation standards for television antennas.

Referring now to FIGS. 2, 3, 4 and 5, the elements of antenna sections A, B and C are energized by transmission lines 11*a* and 11*b* which, in practice, comprise the boom 11 and extend from one end of the antenna to the other. Feed line 11*a* is electrically connected to or may constitute the outer conductor 38 of coaxial cable 16 and feed line 11*b* is an electrical extension of the inner conductor 37. This general technique of feeding the balanced transmission line of a multi-element array with an unbalanced line is described in Pat. No. 3,155,976, assigned to the assignee of this invention.

Figure 2:
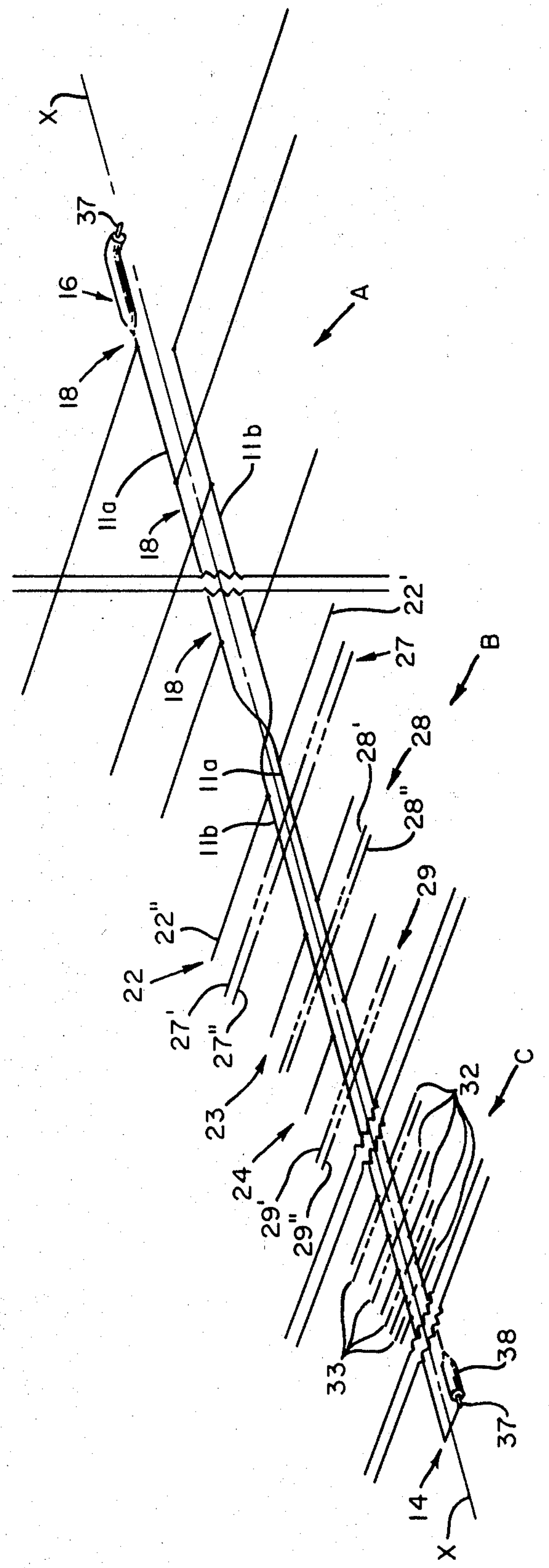
FIG. 2 is a schematic view in perspective showing the relative positions of the antenna elements and the transmission line which feeds them.
Figure 3:
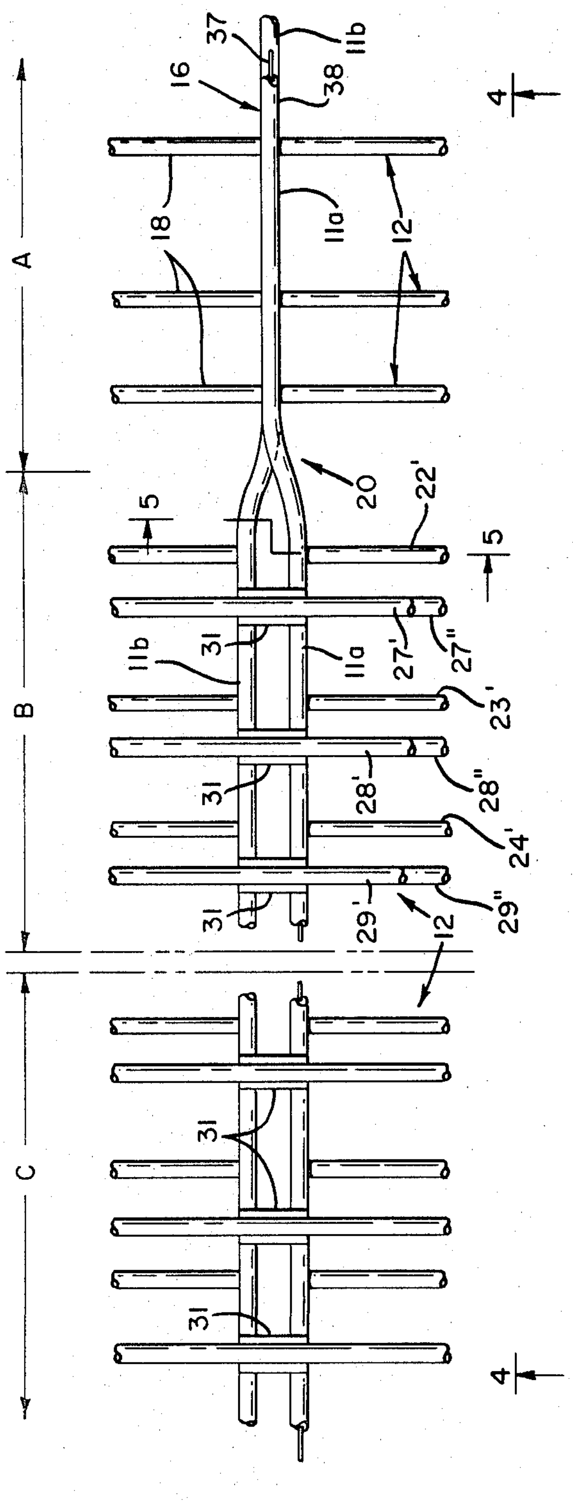
FIG. 3 is a fragmented plan view of a simplified form of antenna embodying the invention.
Figure 4:
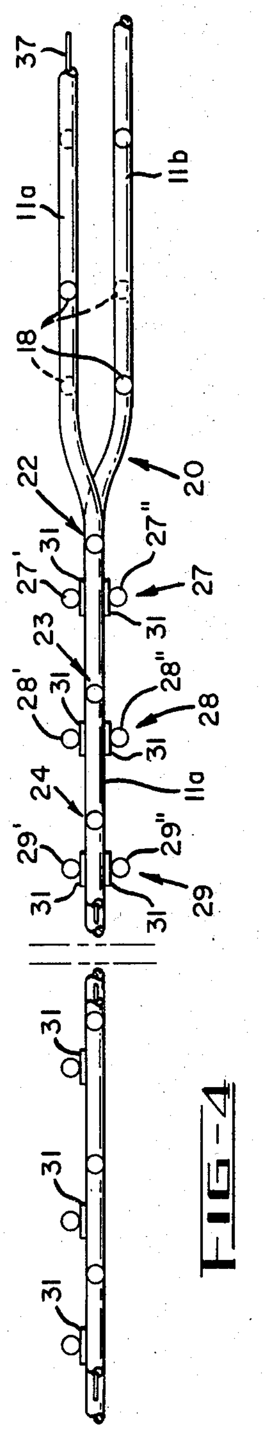
FIG. 4 is an elevation of the antenna of FIG. 3 as viewed on line 4—4 of FIG. 3.
Figure 5:
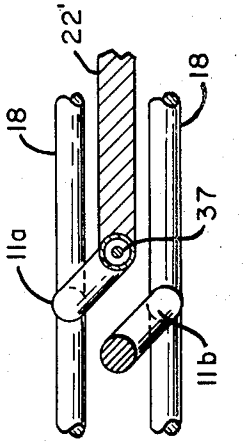
FIG. 5 is a transverse section taken on line 5—5 of FIG. 3.

As shown in FIG. 2, section A of the antenna comprises a plurality of parallel dipoles 18 connected to feed lines 11*a* and 11*b* which are stacked in a plane perpendicular to the dipoles, i.e., vertically stacked and spaced one above the other as shown in the drawing. The elements of dipoles 18 on the same side of the antenna axis X are successively connected alternately to feed lines 11*a* and 11*b*. Antenna sections B and C, however, are fed by lines 11*a* and 11*b* positioned in a plane parallel to the antenna elements, i.e., the horizontal plane as shown. The transition of the feed lines from a vertical plane in section A to a horizontal plane in section B occurs at point 20 where the relative position of the lines is rotated or "twisted" through a quarter of a turn while maintaining an appropriate interline spacing.

Section B of the antenna comprises dipoles 22–26, inclusive, see FIG. 1, which are directly connected to feed lines 11*a* and 11*b* such that the dipole elements on one side of the antenna are electrically connected to one feed line and the remaining dipole elements on the opposite side are connected to the other feed line. Thus, elements 22′ and 22″ comprising dipole 22 are electrically connected to feed lines 11*a* and 11*b*, respectively. The dimensions, i.e., lengths, and spacings of successive dipoles in section B as well as in sections A and C decrease in the direction toward feed point 14 in progressive increments of a predetermined ratio characteristic of the log periodic relationship.

In order to reverse the phase of currents in the feed lines 11*a* and 11*b* between adjacent dipoles in section B as required for an end fire array, parasitic elements 27–30, inclusive, are interspersed between adjacent dipoles, respectively, and are closely coupled to though insulated from feed lines 11*a* and 11*b*. This principle of phase reversal using parasitic elements between dipoles is more fully described in Pat. No. 3,286,268, assigned to an assignee of this invention. Briefly, the parasitic element receives energy in combination with the adjacent driven element, becomes resonant at a frequency corresponding to its dimensions, and simultaneously introduces a phase reversal of the energy in the feed line. Thus, the parasitic element not only reverses the phase of the signal between adjacent driven elements but also acts as an active receiving element itself.

In the course of developing and testing the television antenna, and in particular that portion adapted to receive signals in the high VHF band, i.e., section B, discontinuities and general degradation in the antenna reception patterns were observed to occur at frequencies between the resonant frequencies of adjacent dipoles. This is believed to have been produced by the sharp resonant characteristic (high Q) of the interspersed parastic elements, resulting in a narrow band peaking of the frequency response between the adjacent driven elements and ultimate breakup of the pattern at these points. Furthermore, this undesirable resonance effect of the parasitic elements becomes more pronounced as the antenna length is decreased. In accordance with the invention, this problem is solved by substitution of a parasitic doublet for each single parasitic element at which the pattern breakup occurs. Each parasitic doublet comprises two parasitic elements on opposite sides of the plane containing the adjacent dipoles and equally spaced from that plane and from the nearest dipole. In the preferred embodiment of the antenna, parasitic doublets 27, 38 and 29 are provided in section B, the elements of each doublet being designated the prime and double prime of the corresponding reference character. The effect of each doublet is to lower the Q of the parasitic and thus broaden its freqeuncy rseponse so that no pattern breakup occurs and a uniform signal reception is assured. Insulators 31 separate the individual parasitic elements from the feed lines.

Section C of the antenna comprises dipoles or driven elements 32 and parasitic elements 33 interspersed between the dipoles in the manner described above for section B. However, because of the relatively closer spacing of the driven and parasitic elements in section C, the resonance effect of the single parasitic element does not significantly perturb the reception pattern and therefore the parasitic doublet is not used. In the embodiment shown in FIG. 1, parasitic element 33′ which functions as a reflector for the low frequency dipole 32′ in section C is physically disposed within section B, to the right of dipole 26 as viewed.

The relative lengths and spacings of the driven elements 22–26, inclusive, in section B vary in a log periodic manner along the axis X of the antenna. Thus, the ratio of the spacing S between dipoles 22 and 23 to the length L of dipole 22 is $$\frac{S}{L}=\frac{1-\tau}{2\tan(\alpha/2)}$$

where $\tau$ is a constant and $\alpha$ is the angle of convergence of lines connecting extremities of the dipoles. The relative spacings of axially successive parasitic elements or doublets from the adjacent dipoles, however, are not constant but vary in a non-linear or non-log periodic manner. In particular, the ratio of the spacing $S_1$ between parasitic element 29 and driven element 24 to the spacing $S_2$ between element 24 and adjacent parasitic element 28 is not equal to the ratio of spacing $S_3$ between elements 30 and 25 to spacing $S_4$ between elements 25 and 29. This may be expressed as $$\rho\neq\frac{S_1}{S_2}\neq\frac{S_3}{S_4}$$

where $\rho$ is a constant. This non-linear spacing is likewise applicable to the parasitic elements 33 and adjacent dipoles 32 in section C of this antenna.

In one embodiment of the invention which was actually built and tested, the ratio $\rho$ for section B of the antenna increased from the low frequency to high frequency ends of the section, i.e., from element 22 to element 26. Thus $$\frac{S_1}{S_2}<\frac{S_3}{S_4}$$

For section C of this antenna, the ratio $\rho$ increased from low frequency end of the section to the middle portion and decreased from the middle portion to the high frequency end of the section.

Stated differently, if $S_{nr}$ equals the axial spacing between a driven element and the parasitic element on the low frequency side of the driven element and $\lambda$ equals wavelength at which the driven element is resonant (i.e., twice the dipole length), then the ratio of $S_{nr}/\lambda$ diminishes in a direction from the low to high frequency ends of section B. For antenna section C, this ratio decreases in a direction from the low frequency end toward the middle of that section and then increases toward the high frequency end of the section. These changes or nonlinear variations in spacing betwen driven elements and adjacent parasitic elements are illustrated in FIG. 1 by curves 34 and 35 for antenna sections B and C, respectively.

Sections B and C of the antenna 10 consist essentially of a plurality of axially adjacent Yagi-Uda cells B1 to B5, inclusive, and C1 to C8, inclusive. Each cell comprises a driven element, a reflector consisting of the parasitic element on the low frequency side of the driven element, and a director consisting of a parasitic element on the high frequency side of the driven element. In section C the length of each reflector is equal to the length of the driven element with which it is associated. In section B the length of each reflector is related to the length of the driven element by the geometric factor $1/\sqrt{\tau}$. Each parasitic element functions both as a reflector and as director for the driven elements, respectively, on either side of it. The lengths and spacings between adjacent driven elements are logarithmically related to each other, i.e., by the geometric ratio $\tau$ described above, thereby enabling the series of Yagi-Uda cells to have an significantly broadband response.

The improved performance of the antenna, resulting from the above described variations in spacings of driven and parasitic elements for successive cells in sections B and C is believed to be attributable to the compensating effect such non-linear spacing has on the impedance mismatch between driven element and feed line caused by the somewhat abrupt termination or "truncating" of the antenna sections. More than one cell of the antenna section are active at one time during normal reception of signals in one broadcast channel for that section. More cells therefore are available to receive signals in the central portion of the section than at its ends. As a consequence, the mutual loading effect of the elements varies with longitudinal position, resulting in a corresponding variation in the effective impedance of the elements. Such impedance mismatch is corrected or compensated by change of the impedance affecting relationship of driven and parasitic elements in successive cells, preferably by variation of the spacing between these elements. Other compensation techniques may be employed, however, such as change of the diameters of the dipole and/or parasitic element or lengths of the dipole and/or parasitic element. The simplest and most economical technique, however, is adjustment of the parasitic-dipole spacing. By so improving the match of the dipole impedance to the line, the dipole becomes a more effective receiving element which in turn improves the efficiency of reception of the parasitics. While this improvement in performance has been realized by practice of the invention in a three section television antenna, the concept may also be used with utility and advantage with other log periodic antennas having interspersed parasitic elements, for example, the antenna described in Pat. No. 3,286,268.

Figures 6, 7, 8:
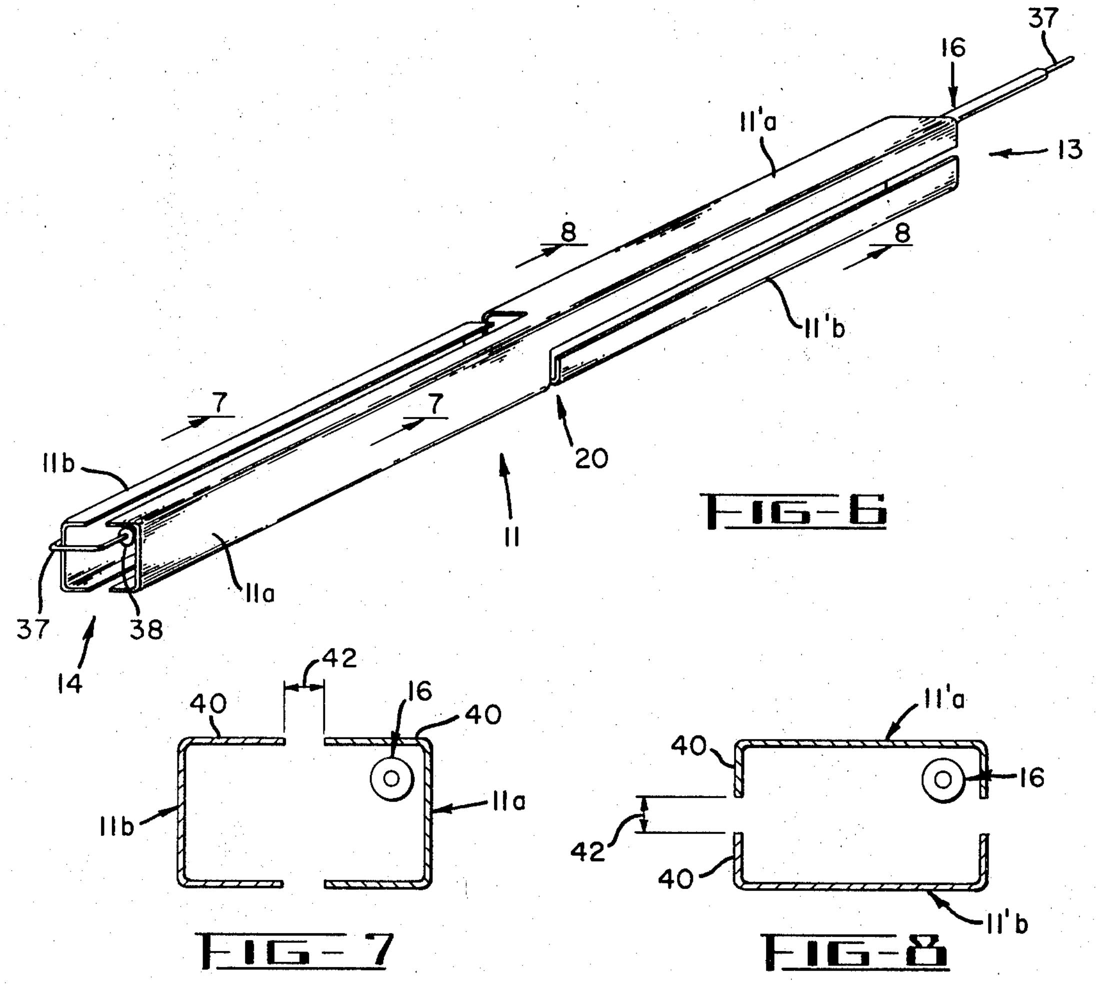
FIG. 6 is a schematic view in perspective of the combination boom and twin transmission line which supports and energizes the elements of the antenna.
FIGS. 7 and 8 are transverse sections taken on lines 7—7 and 8—8, respectively, of FIG. 6.
Figure 13:
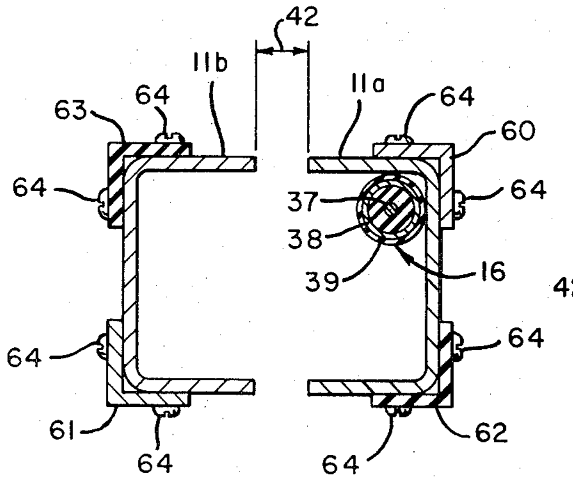
FIGS. 13 and 14 are transverse sections taken on lines 13—13 and 14—14, respectively, of FIG. 12.
Figure 14:
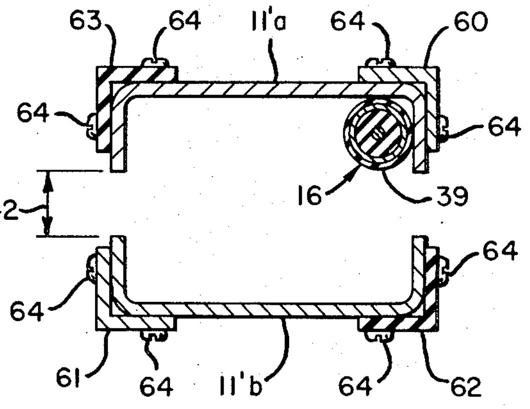

The combination boom and feed line assembly 11 comprises substantially identical channel members **11*a* and 11*b*, see FIGS. 6, 7 and 8, for the front or higher frequency part of the antenna and channel members 11'*a* and 11'*b*, identical relative to each other but not to members 11*a* and 11*b*, for the back or lower frequency portion. These front and back portions of the feed lines are joined or connected at transition point 20 described in detail below. Coaxial cable 16 extends within the channel members for the entire length of the boom and has its center conductor 37 connected at the high frequency end 14 to feed line 11*b* and its outer conductor 38 connected to the adjacent end of feed line 11*a*. This connection of coaxial cable 16 to feed lines 11*a* and 11*b* therefore constitutes the feed point of the antenna. Coaxial cable 16 preferably has an external covering 39** of insulation, see FIGS. 11, 13 and 14, which protects its from damage.

Figure 9:
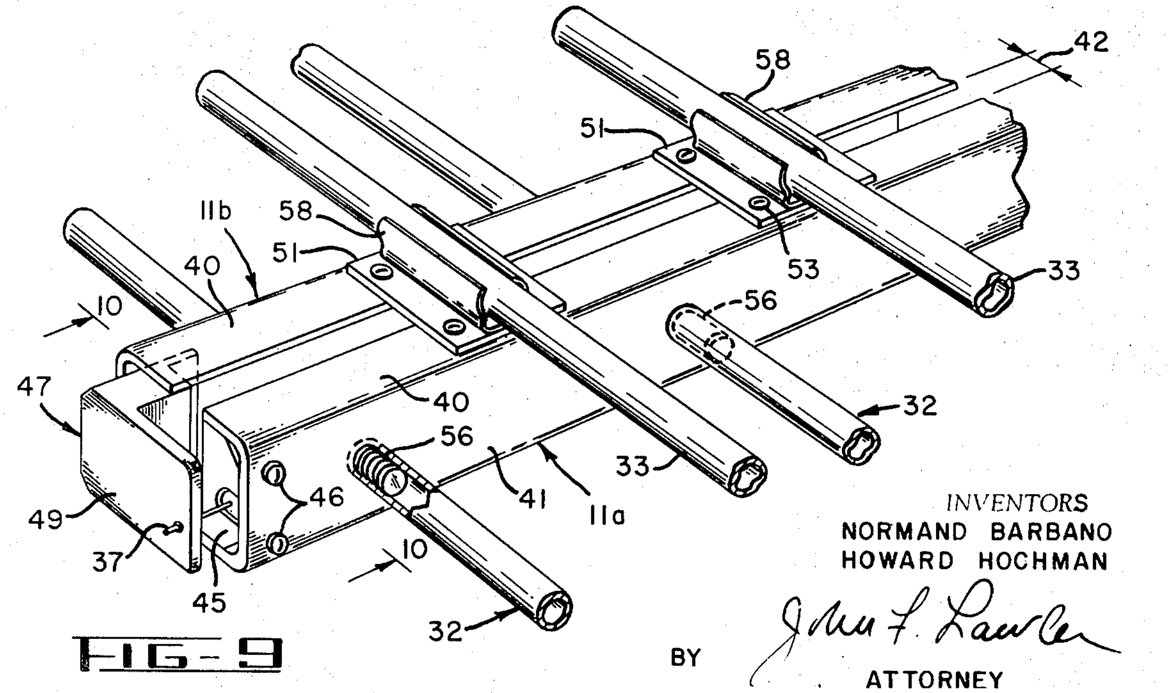
FIG. 9 is an enlarged perspective view of the front or high frequency end portion of the antenna showing the electrical connections at the feed point.
Figure 10:
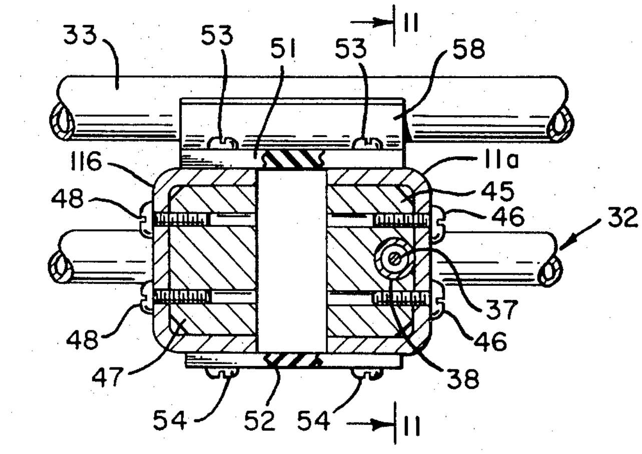
FIG. 10 is a transverse section taken on line 10—10 of FIG. 9.
Figure 11:
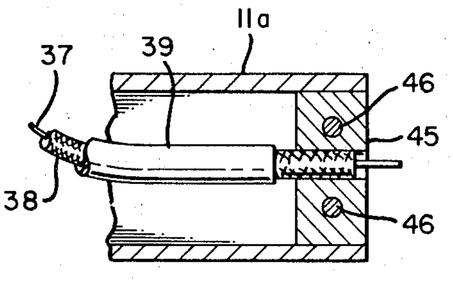
FIG. 11 is a section taken on line 11—11 of FIG. 10.

Channel members **11*a* and 11*b* preferably are substantially identical in size and shape and are symmetrically disposed about the longitudinal axis of the boom. Each channel member has a pair of parallel side walls 40, see FIGS. 9 and 10, connected by an integral end wall 41. The lateral spacing 42 of adjacent side walls 40 of the channels is uniform but this spacing for the back portion of the boom preferably is larger than for the front. In order to electrically connect the coaxial cable 16 to members 11*a* and 11*b*, a conductive clamp 45, see FIGS. 9, 10 and 11, is secured to the interior of channel 11*a* by screws 46 and circumferentially grips outer conductor 38. An L-shaped conductive block 47 secured by screws 48 to the inside of channel member 11*b* opposite clamp 45 has a transversely extending leg 49 to which the forwardly projecting inner conductor 37 of the coaxial cable is connected. Thus, channel member 11*b* is essentially an electrical extension of the center conductor of the coaxial cable. The two channel members are mechanically integrated into a rigid antenna boom by interconnection through a series of longitudinally spaced insulators 51 and 52, see FIGS. 9 and 10, which are fastened to the upper and lower walls 40 of the two channel members by screws 53 and 54**, respectively.

The dipole and parasitic elements preferably are made from ⅜" diameter aluminum tubing. In order that dipoles for sections B and C may be securely though removably mounted on the sides of channel members **11*a* and 11*b*, threaded studs 56 are permanently secured to and project outwardly from walls 41 of the channel members and one end of each dipole tube is tapped for threaded engagement with the stud. The parasitic elements in antenna sections B and C are also releasably mounted on the channel members by spring clips 58 fastened to insulators 51 and 52 in a manner to electrically isolate the parasitics from the channel members. If desired, removable top caps, not shown, may be used to lock the spring clips for more secure retention of the parasitic elements. Conductive spring clips 58' of this type are also used to directly electrically connect dipoles 18** in section A to the channel members, respectively.

Figure 12:
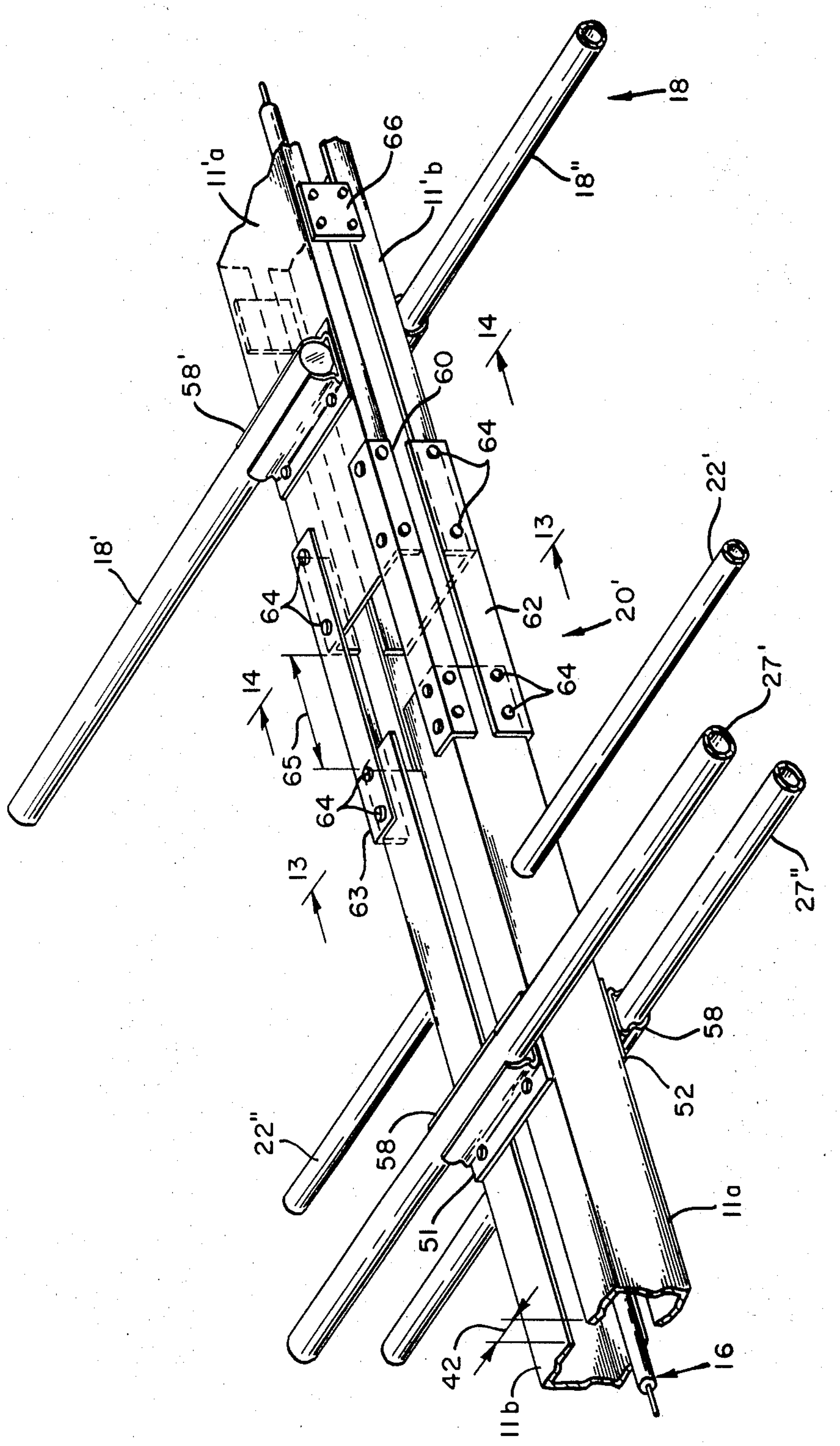
FIG. 12 is a perspective view of the central portion of the antenna showing the connection of the front and rear boom portions at which the "twist" in the two-conductor transmission line occurs.

In order to change the position of the boom channel members from a laterally spaced relationship in sections B and C of the antenna to a vertically spaced relationship in section A, the transition assembly 20', see FIG. 12, is employed. This assembly provides the required twist in the feed lines while maintaining a high degree of mechanical rigidity in the entire boom. Assembly 20' comprises electrically conductive angle-shaped straps 60 and 61 on diagonally opposite corners of the bom and similarly shaped insulating straps 62 and 63 made of high strength dielectric, such as fiberglass, on the other two corners of the boom. These straps are tightly secured by screws 64 as shown to front channel members **11*a* and 11*b* and to rear channel members 11'*a* and 11'*b* and essentially mechanically and electrically bridge the longitudinal gap 65 between the front and back portions of the boom. The length of gap 65 is selected to conform to the characteristic impedance of the line. Longitudinally spaced insulators, one of which is shown at 66 in FIG. 12, maintain contsant the vertical spacing 42 between back channel members 11'*a* and 11'*b*. The dipoles on oppoiste ends of the transition assembly are balanced with respect to each other. To this end dipole element 18' in section A and dipole element 22' in section B, both connected to the same feed line (11'*a*, 11*a*), extend in opposite directions from the boom. Similarly, elements 18" and 22" extend oppositely from the same feed line (11'*b*, 11*b*) at the ends of assembly 20'**.

An important feature of the above described feed line structure is the resultant balanced loading of the line by the dipoles and parasitics connected to it. In section A, the spacings 42 between idential channel members **11'*a* and 11'*b* are symmetrical about the horizontal plane containing the boom axis and have negligible loading effect on the dipoles 18 connected to the top and bottom of the boom. Similarly, the spacings 42 between identical channel members 11*a* and 11*b*** of the front boom portion are symmetrical about the vertical plane containing the boom axis and so have no adverse effect on either the dipoles or the parasitic elements of antenna sections B and C because of the balanced relation of these parts.

The physical length of the entire array described above has been maintained within a practicable limit while retaining the simplicity of a substantally mono-plane array and without superimposing the antenna sections for different bands upon one another. The separate sections of our antenna are axially spaced from each other; for example, the high frequency dipole 26 of section B is axially spaced from the low frequency dipole 32' of adjacent section C. By so separating the individual antenna sections from each other, interaction between the sections is minimized and substantial improvement in gain, front to back ratio, VSWR and pattern uniformity is achieved.

The combination boom and feed line in conjunction with the above described positioning of dipoles and parasitics, provides a lightweight, readily assembled VHF-UHF-FM antenna having all elements supported parallel to each other and symmetrical about the boom axis. These elements, for practical purposes, are in the plane of the boom or, more precisely, lie in the parallel planes which are tangent to or contain the top and bottom walls of the boom. The sections of the antenna responsive to the different frequency bands are disposed in line and in series on the boom and so have a balanced well-ordered appearance in addition to providing a high performance broadband capability.

What is claimed is:

1. A combination boom and feed line structure for a monoplane end fire antenna having an axis and a plurality of axially spaced elements comprising
- a pair of substantially identical channel-shaped electrically conductive members disposed symmetrically about the antenna axis and separated from each other along a plane containg said axis,
- insulator means mechanically coupling said members together,
- means for supporting a first set of antenna elements on said members with the elements parallel to each other and perpendicular to the plane of separation of the members,
- a transmission line electrically connected to said members,
- a second pair of substantially identical channel-shaped members axially aligned with the first named pair of members,
- means for supporting other antenna elements on said second pair of members parallel to the first set of elements,
- the members of said second pair being separated from each other along a plane parallel to said elements and containing said axis, and
- transition means for electrically interconnecting said members of the first named pair of said members, respectively, of the second pair and for mechanically intercoupling said pairs of members.

2. The structure according to claim 1 for a log periodic antenna having elements with lengths and axial spacings decreasing from the low frequency end of the antenna to the high frequency end, said second pair of members being located at said low frequency end, the spacing between members of the second pair being greater than such spacing between members of the first pair.

3. A combination boom and feed line structure for a monoplane end fire antenna having an axis and a plurality of axially spaced elements comprising
- a pair of substantially identical channel-shaped electrically conductive members disposed symmetrically about the antenna axis and separated from each other along a plane containing said axis,
- insulator means mechanically coupling said members together,
- means for supporting a first set of antenna elements on said members with the elements parallel to each other and perpendicular to the plane of separation of the members,
- a transmission line electrically connected to said members, and
- means for directly electrically connecting certain of the first set of antenna elements to said members symmetrically of said plane of separation.

4. The structure according to claim 3 with means for insulating others of said first set of elements from said members symmetrically of said plane of separation.

5. In an end fire antenna having an axis and a plurality of parallel axially spaced antenna elements,
- an elongated longitudinally split tube having an axis coincident with said antenna axis and comprising substantailly identical electrically conductive members on opposite sides of the plane of the split,
- said tube having axially aligned front and back portions, the planes of the splits in the front and back portions being mutually perpendicular,
- means for mechanically and electromagnetically coupling said elements to said members symmetrically about the planes of the splits, and
- transmission line means connected to said members.

6. The antenna according to claim 5 in which said members in the front portion are longitudinally spaced from the members in the back portion, means for mechanically interconnecting said front and back portions and for electrically connecting the members of the front portion to the members, respectively, of the back portion.

7. The antenna according to claim 5 in which each of said members is channel-shaped.

References Cited

UNITED STATES PATENTS

| | | | |
|---|---|---|---|
| 3,482,250 | 12/1969 | Maner | 343—792.5 |
| 2,234,293 | 3/1941 | Usselman | 343—814 |
| 2,297,329 | 9/1942 | Scheldorf | 343—815 |
| 3,362,026 | 1/1968 | Smith et al. | 343—792.5 |
| 3,417,401 | 12/1968 | Veldhuis | 343—792.5 |

ELI LIEBERMAN, Primary Examiner

U.S. Cl. X.R.

343—815, 884